May 26, 1970  E. J. JOHNSTON ETAL  3,513,646
COMBINATION HARVESTING AND THRESHING MACHINE
Filed Nov. 13, 1967
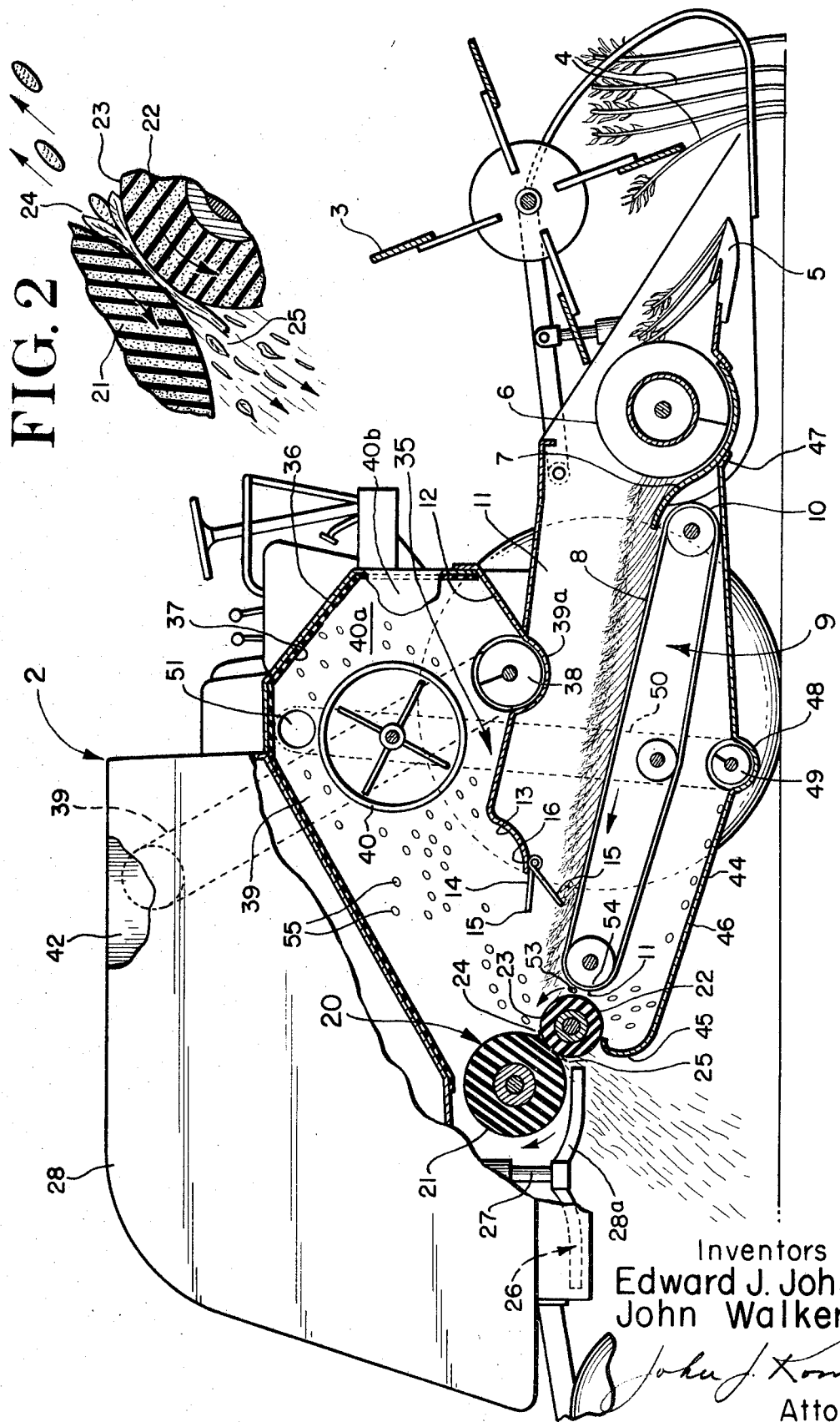
Inventors
Edward J. Johnston
John Walker
*John J. Komalik*
Attorney

# United States Patent Office 3,513,646
Patented May 26, 1970

3,513,646
COMBINATION HARVESTING AND THRESHING MACHINE
Edward J. Johnston, La Grange, and John A. Walker, Downers Grove, Ill., assignors to International Harvester Company, Chicago, Ill., a corporation of Delaware
Filed Nov. 13, 1967, Ser. No. 682,250
Int. Cl. A01d *41/02*
U.S. Cl. 56—20    3 Claims

ABSTRACT OF THE DISCLOSURE

A harvesting and threshing machine incorporating a pair of resilient rollers through which the harvested straw and grain is passed, the rollers snapping the grain out of the husks and projecting the grain into a storage receptacle.

---

This invention relates to a combination harvesting and threshing machine commonly known as a combine and more specifically concerns the threshing and the grain handling components of the machine.

It has been a practice heretofore to provide a threshing unit having a cylinder which incorporates a concave with rub bars. Grain is passed between the cylinder and the concave and the threshed grain drops through the concave sieve into an associated receptacle or conveyor. This type of construction leaves much to be desired in that it does not thresh all of the grain and therefore it is necessary to provide an extensive shaker and retriever mechanism rearwardly of the threshing cylinder for the purpose of shaking off any remaining adhering grain. Furthermore, the threshing cylinder concave arrangement requires careful adjustment which must be constantly watched to obtain maximum performance.

A general object of the invention is to provide a novel threshing component which obviates the foregoing difficulties and in which adjustments are eliminated.

A further object of the invention is to provide a novel threshing component which incorporates a pair of cooperatively arranged rollers wherein preferably each of the rollers is constituted of a body of elastomer material, the rollers functioning to grasp the straw-laden grain and to pull it in between the rollers and as the crop is being drawn through the intake nip of the rollers, deflection of the rollers functions to snap the seed out of the husk and to project it into an associated receptacle.

A more specific object of the invention is to design a novel threshing mechanism wherein the rollers are oriented not only to function as the separating means but also to traject the seeds into an associated receptacle and wherein the threshing component will only thresh the ripe grain kernels but will pass the unripe material through the rollers thus avoiding contamination of the ripe kernels with the green material which tends to deteriorate the grain stock.

These and other objects and advantages inherent in and encompassed by the invention will become more readily apparent from the specification and the drawings, wherein:

FIG. 1 is a diagrammatic rear elevational view partly in vertical section of harvester thresher machine incorporating the invention; and FIG. 2 is an enlarged cross-sectional view showing the action of the rollers in snapping seed out of its husk.

The invention is shown in association with a typical combine harvester structure generally designated 2 which is of a self-propelled or towed type as is well known to those skilled in the art and which incorporates a reel 3 which combs through the standing grain 4 in the field and advances the grain as it is cut by the conventional cutter bar or sickle or mower mechanism 5 to an auger 6 the auger converging the material centerwardly and then delivering the material upwardly and rearwardly over the platform extension 7 onto the upper or advanced run 8 of a draper apron conveyor generally designated 9 which has a lower receiving end 10 and an upper delivery end 11 for conveying the grain-laden straw upwardly and rearwardly. The instant invention embodies a receiver 35 above the conveying tunnel 11 including a plate structure 12 which has a rearward downwardly dependent portion 13 from which depends a grain-combing baffle structure 14 including a series of flaps 15 pivoted on a horizontal axis as by a shaft 16 from the lower rear end of the rear portion 13 of the wall structure 12. The baffle members 15 are adapted to lay on the crop which is being advanced upwardly and rearwardly in the direction of the arrow shown in FIG. 1 into the separating mechanism generally designated 20.

The separating mechanism 20 comprises a pair of rollers 21 and 22 each of which has a body of rubber or elastomer material. The lower roller 22 has its periphery 23 sweeping upwardly adjacent to the discharge end of the advance run of the apron 8 for advancing the grain laden over the top of the forward, lower roller into the intake nip 24 which is formed between the portions of the cooperating upper and lower rollers 21 and 22. It will be seen that the material is passed between the rollers pursuant to powered rotation of the rollers as is seen in FIG. 1 and that the straw together with the chaff exits as at 25 downwardly and rearwardly.

If desired, or if the conditions warrant, a plurality of beaters 26 may be provided, each of which comprise a vertical power driven shaft 27 suitably supported from associated frame structure 28 of the mechanism 2. Each of these shaft 27 carry rubber flails 28a which are secured to the lower end of the shaft 28', and the flails are of sufficient length to sweep under the upper roller 21 across the discharge area 25 so as to maintain the rollers clear of any material and at the same time scattering the material laterally or transverse the traverse of the machine about the field. It will be seen that the intake area of the rollers 21 and 22 is directed upwardly and forwardly so that as the crop is delivered into the rollers, said rollers cause the husks, or the pods in the case of beans and cause the seed because of the elasticity of the material of the rubber rollers, to snap the husks or the hulls and to project the seeds upwardly and forwardly into the hopper structure 35 which is disposed above and forwardly of the rollers 21 and 22. At the forward side of the hopper there is provided an enclosing forward wall and an upper wall structure 36 which is lined with any suitable soft flexible material such as foam rubber 37 against which the seeds impinge without cracking and bounce downwardly upon the sloped walls of a bottom developed by the wall 12 into an auger 38 which has its trough portion 39a also formed in the wall 12. It will be seen that at one side wall 40a (the other side wall 40b being only fragmentarily shown) of the receiving chamber 39 which in part is formed by the hopper there is provided a suction fan 40 which exhausts externally of the housing 39 for removing chaff and the like from the aggregate. The fan is constructed to provide an adequate air flow through the chamber 39 to draw the chaff out without drawing the seed therealong. The auger 39 is continued alongside the housing 28 which forms a grain tank 42 to which extends the discharge end of the auger 39.

Beneath the conveyor 9 there is provided a grain saving hopper 44 which has an upturned rear edge portion 45 adjacent to the periphery 23 of the lower roller whereby forming a stripper therefor to prevent wrap of material therearound. The hopper 44 has a bottom 46 which extends beneath the entire conveyor 9 and at its forward end is suitably connected to the platform wall 7 as at 47. The wall 44 is also formed to provide an auger trough 48 for an auger 49 which continues into a suitable tube auger construction 50 said auger 50 being suitably connected to chamber 39 as at 51 for dumping the grain, chaff, etc. thereinto across the air flow of the fan 40 whereby the seed is dropped into the auger 39 and is augered thereby into the grain tank 42.

It will be noted that baffle portions or paddles 14 serve to effectively prevent the seed from being thrown out of the separating chamber and if it does impinge on the baffle plates and drops into the advancing crops, the seed will gravitate downwardly and fall as at 53 between periphery 23 of lower roller and the discharge end 54 of the conveyor 9 into the reclaiming hopper. Otherwise all of the other grain is actually snapped out of the husks or pods in the case of beans and is caused to be propelled upwardly as seen at 55 (FIG. 1) into the hopper portion of the chamber 39 whereby the grain is then carried to the storage bin.

It will be understood that the flow of the crops on the advance apron 8 is controlled so as not to bunch the material but feed it at a uniform rate thinly spread out so that the oncoming material does not interfere with the propulsion of the seed as it is being snapped forwardly of the separating rollers.

It will be readily noted that with the instant structure the convention straw rack mechanism is entirely eliminated. The rollers which are preferably made of tire carcass discs compressed together are determinative of whether the grain or crop is in ripe condition. If the crop is green all of the material including the seeds pass through the rollers. This immediately informs the operator to cease operation inasmuch as the grain has not matured properly. If there is a negligable intermixture of ripe and unripe grain, the thresher actually separates the ripe from the unripe since only the ripe grain will snap off.

What is claimed is:

1. A machine for harvesting seed crops comprising a platform, cutter means thereon for severing crops from the field, conveying means on the machine for conveying the crops in a predetermined path from said cutter means and platform, a pair of elastomer-covered cooperatively arranged rollers extending across said path of conveyance of said crops in receiving relationship thereto and defining a crop-receiving upwardly directed nip therebetween, means for rotating the rollers for passing the crops therebetween, one of the rollers being adjacent to the conveying means and the other upwardly and rearwardly thereof, said rollers pursuant to their rotation adapted to receive the cut crops thereupon and attendant to deflection of the elastomer material of the rollers as the stalks of the crops pass therebetween to snap off the seed and propel the same in a trajectory over said path of conveyance of the incoming crops, and a receptacle disposed in alignment with said trajectory for receiving the seed.

2. The invention according to claim 1 and said conveying means having a delivery end at said rollers, and one of the rollers being slightly spaced from the delivery end of the conveying means and defining a passage therebetween for passing loose seeds therethrough, and means for collecting such loose seed communicating with the passage.

3. The invention according to claim 1 and said container having a lower wall superposed with respect to said conveying means adjacent to the rollers, and a baffle means pendulously supported from said wall for preventing exit of seed between the wall and conveying means.

References Cited

UNITED STATES PATENTS

| | | | |
|---|---|---|---|
| 763,361 | 6/1904 | Briggs et al. | |
| 1,930,647 | 10/1933 | Hillas et al. | 56—20 |
| 2,424,171 | 7/1947 | Huddle. | |
| 3,387,612 | 6/1968 | Tillotson | 150—30 |

ANTONIO F. GUIDA, Primary Examiner

U.S. Cl. X.R.

130—30